INVENTOR
Hideo Tatibana
BY
ATTORNEY

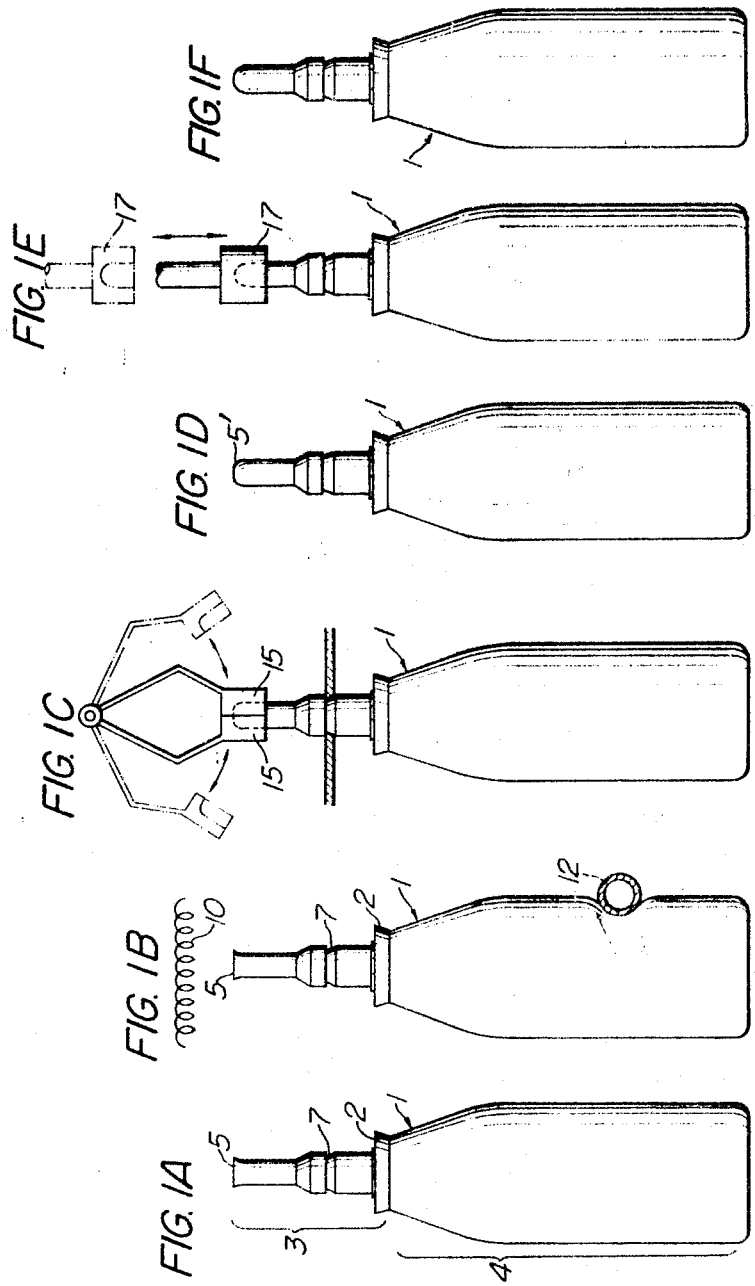

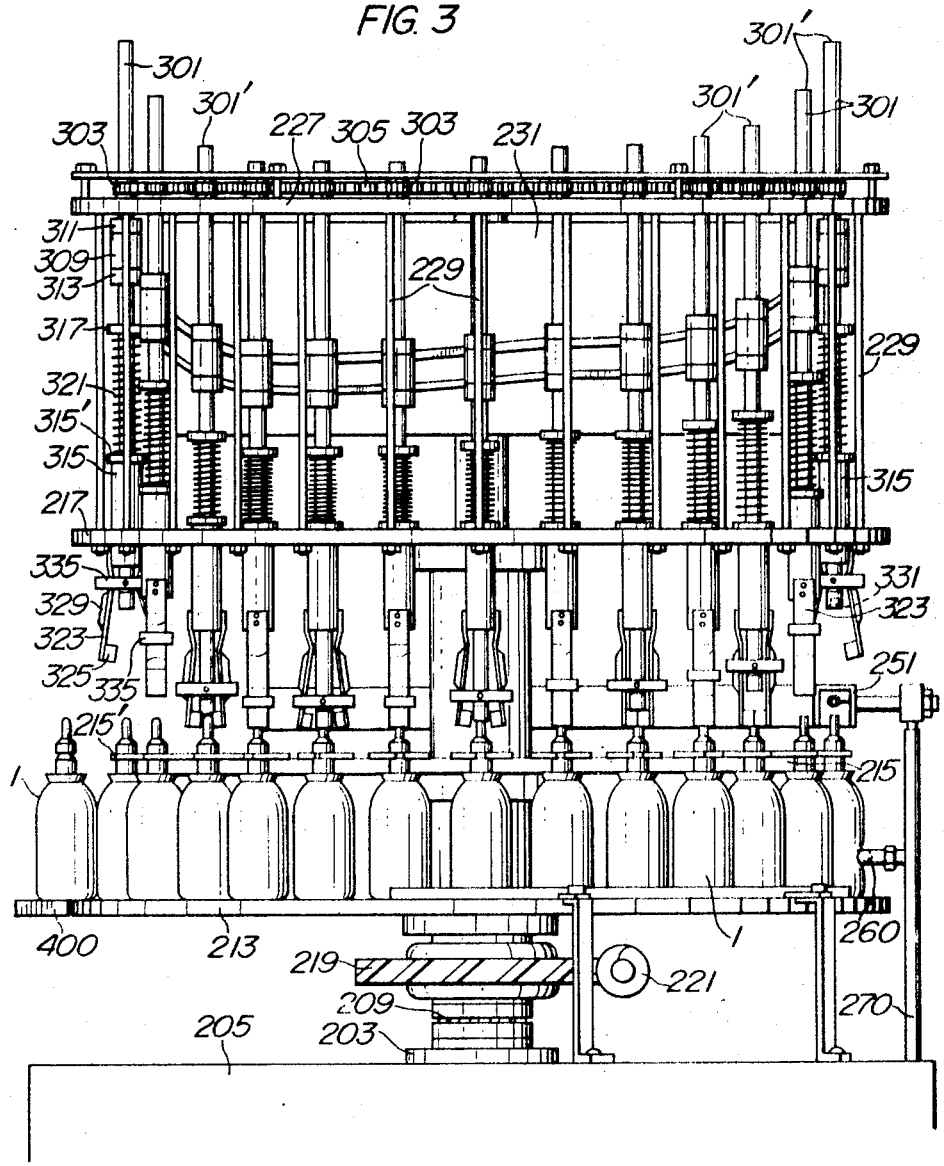

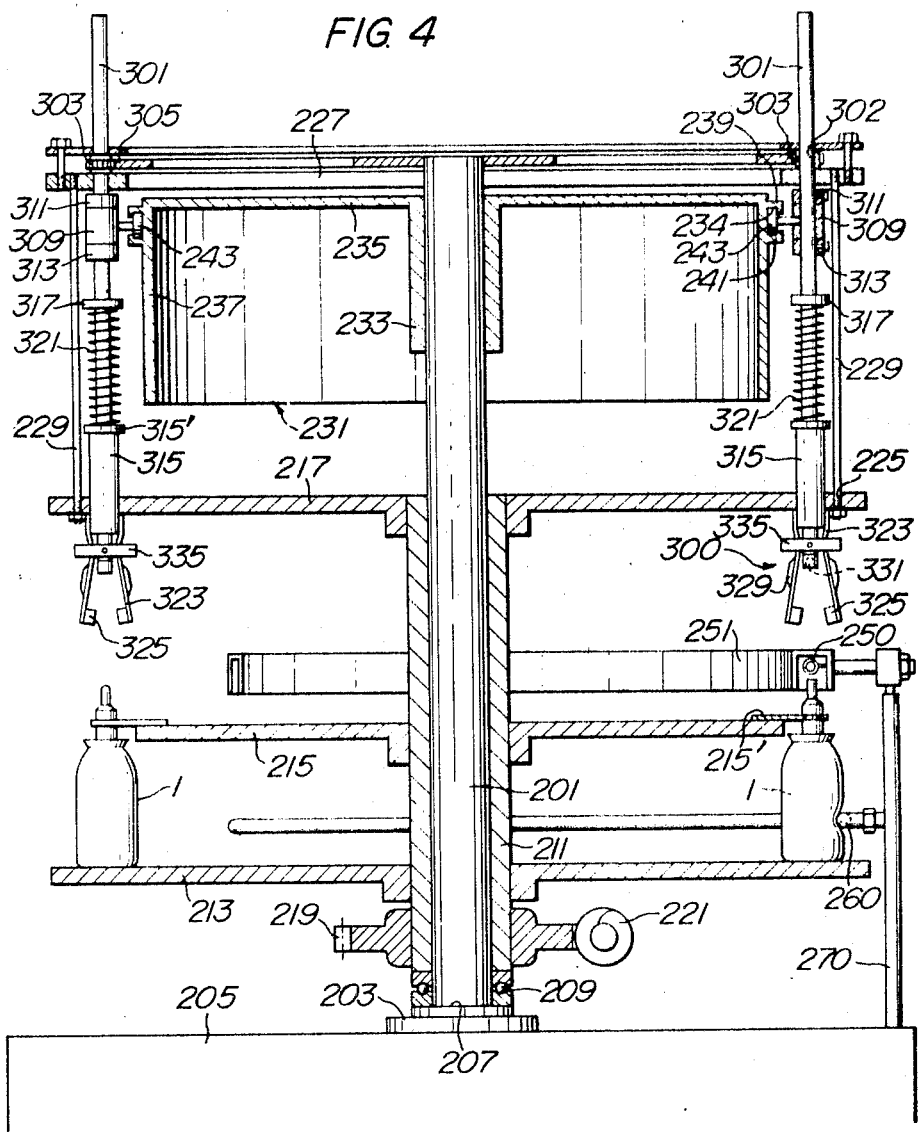

United States Patent Office 3,457,694
Patented July 29, 1969

3,457,694
METHOD OF AND APPARATUS FOR FUSION SEALING OF THE OPENING OF FLEXIBLE PLASTIC BOTTLE-LIKE CONTAINERS
Hideo Tatibana, 3–5, Nakano-6-chome, Nakano-ku, Tokyo, Japan
Filed July 28, 1967, Ser. No. 656,890
Claims priority, application Japan, Aug. 25, 1966, 41/79,748; Mar. 18, 1967, 42/16,963
Int. Cl. B65b 51/10, 53/02; B67b 5/00
U.S. Cl. 53—39                                   7 Claims

ABSTRACT OF THE DISCLOSURE

A method of fusion sealing containers of thermoplastic material having their openings at the top and being filled with liquid and two kinds of the apparatus for conducting the method are described. The fusion sealing operation comprises raising the level of the liquid in the container slightly, heating the opening portion of the container, thus preventing unnecessary heating of the portions of the container which are not to be heated, and sealing the opening with a mold or molds on lowering the level of the liquid, under the condition that the containers are moved intermittently so that the sealing is effected to a container which is stopping or that the containers are moved continuously so that the sealing is effected to containers which are moving.

The present invention relates to a method of and an tainers and more particularly relates to a method of and an apparatus for fusion sealing the openings at the top of liquid-containing flexible plastic bottle-like containers on a continuous basis.

The present invention is concerned with a method of and apparatus for practicing fusion sealing, wherein a mold assembly is used.

According to one aspect of the present invention, there is provided a method of fusion sealing the opening of a liquid-containing flexible plastic container at the top end thereof, which method comprises the steps of elevating the surface of a liquid in the container by pressing the body section of said container, fusing the opening portion of the container with heat while maintaining the liquid surface at that elevated level, lowering the liquid surface to the original level and fusion sealing the opening thus fused with a concaved mold.

According to another aspect of the present invention, there is provided an apparatus for fusion sealing the opening of a liquid-containing plastic container, which comprises conveyor means for carrying a number of plastic containers thereon in a single row at a predetermined interval, pressing rod means arranged in parallel to the row of containers being carried and adapted to press the body sections of the containers slightly to elevate the surface of a liquid in said containers to a level above the shoulder of said containers, heating means for fusing the opening portions of the containers arranged in parallel to said pressing rod means and mold means arranged to engage the opening of each of said containers at a point downstream of said pressing rod means and said heating means.

More specifically, the apparatus, particularly conveyor system thereof, for the fusion sealing of the opening of a liquid-containing plastic container, according to the present invention, includes a container support disc for carrying a number of containers thereon fixedly mounted on a vertical shaft concentrically perpendicularly thereof and a container retaining disc having a number of detent notches formed peripherally thereof for holding the containers at fixed positions on said support disc by the engagement with the necks of said containers and thereby holding the opening of each container at a predetermined level against the depression of the mold means, and the pressing rod means and heating means are formed in a semicircular shape concentric with the vertical shaft.

According to still another aspect of the present invention, there is provided, as a special form of the invention, an apparatus for the fusion sealing of the opening of a liquid-containing plastic container of the type described, in which the conveyor means is driven intermittently in a manner such that the containers are fed into the fusion sealing mechanism each at each movement of said conveyor means and the mold means is located in a predetermined position in which the containers are brought to a halt, whereby said mold means is lowered for fusion sealing the opening of each container during the period in which said conveyor means is held stationary.

The most advantageous effect of the present invention may be achieved in another special form of the invention, i.e., as apparatus for the fusion sealing of the opening of a liquid-containing plastic containers of the type described, in which the conveyor means is driven continuously and the mold means is mounted to the lower end extremity of each of a number of spindles which are respectively rotatably and vertically movably supported in a corresponding number of holes provided above the respective container holding detent notches formed peripherally of the retaining disc fixedly mounted on the vertical shaft concentrically perpendicularly thereof, each of said spindles being moved up and down by a stationary cylindrical cam as said conveyor means rotates.

With the continuously operative apparatus of the invention described above, a two-step fusion sealing operation can be performed very smoothly by arranging the mold means in the following manner. Namely, each of the spindles carrying the mold means is rotatably and vertically movably supported by an upper guide disc and a lower guide disc, which are fixedly mounted on the vertical shaft, and is formed with a finishing mold in the lower end face thereof. The spindle also has a sleeve slidably mounted thereon under the bias of a coil spring and said sleeve carries a pair of leaf springs at the lower end thereof which are fixed thereto at their upper ends to extend downwardly and are provided at their lower ends the halves of a split mold in confronting relation. Each of the leaf springs has an angle cam mounted on the backside thereof and an annular cam connected to the lower end portion thereof by means of a pin extending through said spindle at right angle thereto. With the arrangement described, when the spindle moves downwardly with the sleeve thereon, the sleeve is first stopped from moving downwardly by the lower guide disc and, as the spindle alone moves further downwardly, the annular cam is brought into engagement with the angle cams causing the split mold sections to be closed in engagement with the opening of the container, whereby the opening is subjected to preliminary shaping. Thereafter, the annular cam is moved out of engagement with the angle cams, whereupon the mold sections are opened again, and the spindle moves further downwardly bringing the finishing mold into engagement with the preliminary shaped opening, whereby said opening is subjected to fusion sealing and final shaping.

It is, therefore, the object of the present invention to provide a method of and an apparatus for fusion sealing the openings of a number of containers automatically continuously by softening the opening portions only of the containers with heat, by making use of the flexibility of the plastic containers, and fusion sealing said openings by respective mold means in a neat manner.

In order that the present invention may be more clearly understood, reference may now be had to the accompanying drawings in which the present invention is illustrated by way of example and in which:

FIGURES 1A to 1F are views illustrating the various states of the operation for fusion sealing the opening of a flexible plastic bottle-like container, performed by the apparatus of this invention; particularly the one shown in FIGURES 3, 4 and 5;

FIGURE 3 is a side view illustrating a second embodiment of the apparatus of this invention;

FIGURE 4 is a cross sectional side view through the axis of the apparatus shown in FIGURE 3.

Figure 2A:
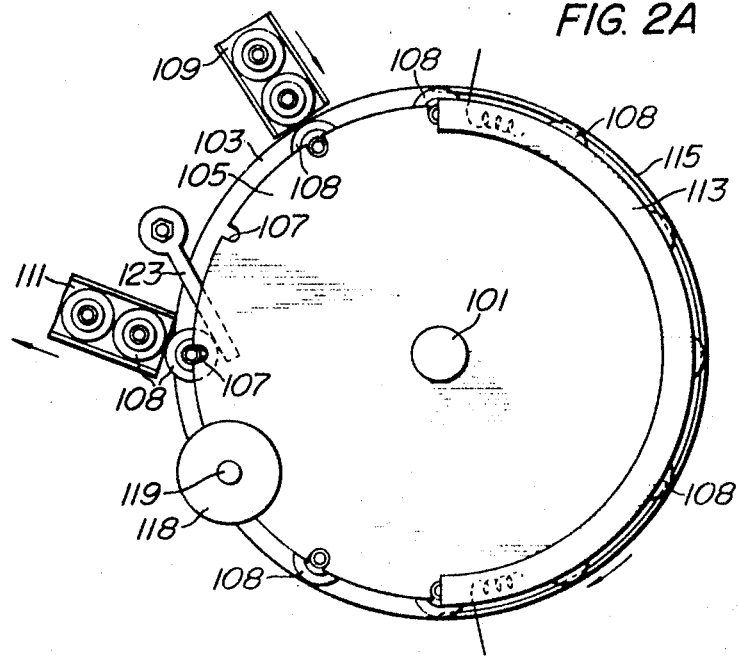
FIGURES 2A and 2B are a plan view and a side view respectively, illustrating a first embodiment of the apparatus of this invention.

First of all, the manner in which the fusion sealing operation according to the present invention is carried out, will be described with reference to the accompanying drawings. Referring first to FIG. 1A, there is shown a flexible plastic container, generally indicated at numberal 1, of the type, such as plastic milk bottle, which has an opening at its top end and which is filled with a liquid, said container being hereinafter referred to as container for simplicity. The shoulder 2 and neck 3 of the container 1 have a greater wall thickness and therefore are more resistive to an external force than the portion 4 below said shoulder, since the container of this type is normally manufactured by blowing a tubular material raving a relatively large wall thickness and small inner diameter. Fusion sealing of the container is carried out by softening the opening portion 5 upon fusing the same and the closing said opening portion by pinching it with a split mold. In this case, since the neck portion is relatively hard as stated, the fusion sealing is effected while holding the portion above a groove 7 by means of a support member fitted in said groove, so as to prevent possible deformation of the container under the force of said mold.

The opening 5 of container is conveniently heated by the radiation heat from a heating wire 10 as shown in FIG. 1B. In this case, however, it is necessary to avoid softening and deformation of the shoulder 2 and the adjoining areas of the container by the heat, and for this purpose the body section 4 of the container is slightly pressed inwardly at the mid portion thereof by a pressing rod 12 so to raise the liquid level in the container up to the neck 3.

In the stage of operation shown in FIG. 1C, the opening 5 is pinched from both sides by split mold sections 15, 15 for preliminary fusion sealing operation. As a result of this operation, the opening 5 is shaped as at 5′ in FIG. 1D. However, since a complete shaping and sealing of the opening cannot be obtained by such preliminary fusion sealing operation, the sealed top end 5′ is further depressed from above by a mold 17 as shown in FIG. 1E, whereby the top end 5′ is completely sealed in a neat shape as shown in FIG. 1F. Preferably, the interior wall of the mold 17 is formed of a thermosetting resin.

Where the top end portion 5 of container 1 shown in FIG. 1A has a large wall thickness relative to the inner diameter thereat, a complete fusion sealing may be obtained in a single step using the mold shown in FIG. 1E.

Now, a first embodiment of the apparatus according to the present invention will be described hereunder with reference to FIGS. 2A and 2B. The apparatus in this embodiment is adapted to be used for fusion sealing the opening of a container of the type in which the wall thickness of the opening is relatively large with respect to the inner diameter thereat and which therefore is sealable with a single mold.

Figure 2B:
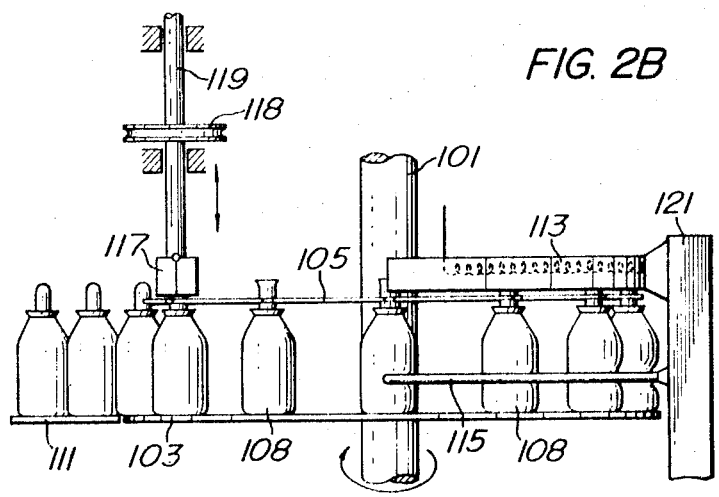

From FIGS. 2A and 2B, it will be seen that the apparatus includes a rotatable vertical shaft 101, and a lower disc 103 and an upper disc 105 which are fixedly mounted on said vertical shaft concentrically thereof. The upper disc 105 has a total of twelve equally spaced detent notches 107 formed peripherally thereof and each detent notch 107 is so shaped that its configuration and width are suitable to receive the neck of the container 108 therein. The vertical shaft 101 is provided with driving means, whereby the entire assembly may be rotated in a direction of the arrow intermittently at a pitch corresponding to the peripheral pitch at which the detent notches 107 are formed.

Each of the positions at which the twelve detent notches 107 are to be held stationary, constitutes a station, and at a location corresponding to the first station is provided a container supply conveyor 109, whereas at a location corresponding to the eleventh station is provided a container discharge conveyor 111, both of said conveyors being arranged at the same level as the upper surface of the lower disc 103. An electric heater 113 and a pressing rod 115, which are semicircular in shape, are provided over the circumferential length from the second to the eighth stations. At the tenth station is provided a vertical spindle 119 which carries at its lower end extremity a mold 117 and which is caused to make an intermittent vertical movement, while rotating, along the axis of the container 108 which is being held stationary at said station in engagement with the corresponding detent notch 107. The spindle 119 is moved vertically intermittently while rotating, by way of a pulley 118. Such operation of the spindle is effected by any conventional mechanism which will not be explained herein.

The electric heater 113 is preferably provided in the form of a semicircular, downwardly facing through and arranged concentrically of the upper disc 105 in such a manner as to enclose the upper portions of the necks of containers 108, so that the upper end portions of the necks of containers 108, being carried on the lower disc 103 with their necks supported by the respective notches 107 in the upper disc 105, are softened by the heat of said semicircular electric heater during travelling along said electric heater as described previously. On the other hand, the pressing rod 115 is arranged also concentrically of the upper disc 105 at a level slightly above the lower disc 103 so as to indent the outer wall of the body sections of containers in a predetermined degree when said containers travel underneath the electric heater. This pressing rod consists preferably of a hollow metallic tube to provide for circulation of a cooling water through the internal hollow thereof. Both of the electric heater 113 and the pressing rod 115 are securely held in position by a suitable member 121.

In the vicinity of the eleventh station, where the discharge conveyor 111 is provided, is disposed a container ejector plate 123. This ejector plate is fixed in position and serves to eject the sealed containers outwardly so as to facilitate said containers riding on said conveyor 111.

The container supply conveyor 109 is provided with container supply control means not shown, so that said conveyor supplies the containers intermittently in a timed relation to the itnermittently rotating discs 103 and 105. The control means may be of any known type which has conventionally been used with this type of apparatus, and is therefore not described herein.

In operating the apparatus in this embodiment constructed as described hereinabove, the containers, each filled with a liquid, are supplied by the supply conveyor 109 in such a manner that the necks thereof are fittingly received in the corresponding detent notches 107. The containers thus mounted are carried from the second station to the eleventh station in sequence intermittently along a circular path, while being held by the discs 103 and 105, until they are sealed and finally carried away by the discharge conveyor 111. During their passage from the second to the eighth stations, the containers are subjected at their body sections to a predetermined pressure from the exterior, so that the liquid level in each container is elevated slightly up to the neck of the container, and concurrently the top end portion of the neck are progressively softened by the heat from the electric heater 113.

Upon reaching the tenth station, the top opening of the neck of each container is rounded and sealed by the shaping mold 117, similar to that described previously with reference to FIG. 1E, which is lowered from above into engagement with said top opening.

Next, the second embodiment of the apparatus of this invention will be described with reference to FIG. 3 which shows the external appearance of the apparatus in operative position and to FIG. 4 which shows a cross section of the same through the axis thereof.

As may be seen, the apparatus in this embodiment, like that in the preceding embodiment, performs the fusion sealing operation with shaping molds during its circular movement, but this apparatus is distinguishable over that in the first embodiment firstly in that, while in the latter the containers are moved intermittently so that the sealing operation is conducted at a spot, the former is operated continuously and the sealing is effected to moving containers, and secondly in that in the former the shaping of the top opening of the neck of container is accomplished with two different molds as having been described earlier with reference to FIGS. 1A to 1F in contrast with the latter where a single mold is employed.

Referring now to FIGS. 3 and 4, a shaft 201 constitutes a stationary vertical shaft having its lower end securely mounted on a base 205 through the intermediary of a mounting member 203. The mounting member 203 has a thrust bearing 209 mounted on the upper surface thereof, which thrust bearing in turn has a sleeve 211 mounted thereon, said sleeve being rotatable with respect to the shaft 201 and carrying a bottom disc 213, a support disc 215 and a lower guide disc 217, which are all fixedly mounted thereon in concentrical relation and at three different levels with suitable space therebetween. A worm gear 219 is mounted on the lower portion of the sleeve 211 to be driven by a worm 221.

The lower guide disc 217 has a number of equally spaced apertures 225 bored therethrough peripherally thereof. Above the lower guide disc is arranged an upper guide disc 227 with a suitable space therebetween. The lower and upper guide discs 217 and 227 are connected integrally by elongate studs 229 which are inserted vertically through the corresponding apertures 225 from the lower side and screwed into the corresponding internal threads formed in the peripheral edge portion of the upper guide disc 227. Thus, it will be seen that the sleeve 211, bottom disc 213, support disc 215, lower guide disc 217 and the upper guide disc 227 constitute an integral unit which is rotatable about the shaft 201.

The shaft 201 has a stationary cylindrical cam 231 mounted thereto between the upper and lower guide discs. Namely, the cylindrical cam 231 is fixedly mounted on the fixed vertical shaft 201 at a boss 233 thereof and is composed integrally of a circular top plate 235 extending horizontally from the boss 233, a cylindrical member 237 extending downwardly from the peripheral edge of said circular top plate, and upper and lower annuli 239 and 241 formed on the exterior wall of said cylindrical member to define an annular groove 234 constituting a cam follower guide passage. The guide passage 234 formed on the exterior wall surface of the cylindrical member 237 has a substantially sine curve-like shape and serves to cause a reciprocatory vertical movement of a cam follower 243 in engagement therewith, the associated mechanism of which will be described later.

Similar to the apparatus shown in FIGS. 2A and 2B, the apparatus of FIGS. 3 and 4 also includes a container supply conveyor, a discharge conveyor, electric heating means and container pressing means. The container supply and discharge conveyors may be of the ordinary type and will not be described nor illustrated herein.

The electric heater 250 may be of exactly the same construction as that used in the first embodiment and is provided in the form of a downwardly facing semicircular trough 251 which is concentric with the shaft 201.

The pressing rod 260 may also be the same as that used in the first embodiment shown in FIGS. 2A and 2B and is provide over substantially the same circumferential lengths as the electric heater 250 concentric with the shaft 201. The electric heater 250 and the pressing rod 260 are secured at several points by suitable fittings so as to be immovable with respect to the base 205.

The support disc. 215, which corresponds to the disc 105 in the first embodiment shown in FIGS. 2A and 2B, carries at its peripheral edge an annular member 215', similar to that shown in FIG. 1C, which is formed with a number of detent notches therein for supporting the neck portions of containers rigidly against the depressing force of the mold exerted thereon.

As described, the apparatus shown in FIGS. 3 and 4 is operated not intermittently but continuously, and the containers 1 fed into the apparatus and supported by the respective detent notches in the annular support member 215' of support disc 215, are sealed during their circular movement about the shaft 201 along with fusion sealing mold means to be described hereinafter.

The fusion sealing mold means, as described earlier, consist of a series of mold assemblies generally indicated at 300, which are rotatably and vertically movably supported by the lower guide disc 217 and upper guide disc 227. Each of the mold assemblies has a spindle 301 which is supported in each of equally spaced holes bored peripherally of the upper guide disc 227 at positions immediately above the respective containers 1. The spindle 301 has a pinion 303 fixed thereon above the upper guide disc 227, which pinion is intermeshing with a large gear 305 fixed to the top end of shaft 201. Thus, it will be understood that, when the containers are bodily rotated about the shaft 201, along with the sleeve 211, bottom disc 213, and upper and lower guide discs 217 and 227, by the worm gear mechanism 221 and 219, the spindle 301 in each of the mold assemblies 300 is also rotated at a predetermined rate.

In this case, the spindle 301 is moved up and down by the action of the cam follower 307 which is in engagement with the aforementioned guide groove 243. Because the cam follower 307 is fixed to a cylindrical member 309, rotatably mounted on the spindle 301, and vertical movement of the cylindrical member 309 with respect to the spindle 301 is limited by respective stoppers 311 and 313 also fixed to the spindle 301. Consequently, the spindle 301 is caused to make an up and down movement, while rotating, as the cam follower 307 travels in the cam groove 243 formed concentrically of the shaft 201 in a sine curve-like shape.

The spindle 301 carries at its lower portion a mold which is adapted to engage the top end of the container 1 to seal the same. The detail arrangement of this portion is shown in FIGS. 5A to 5D. The spindle 301 also has a sleeve 315 slidably mounted on the lower portion thereof, which sleeve is rotatably slidably supported in each of holes 316 bored through the lower guide disc 217. A coil spring 321 is mounted between a flange 315' formed at the top end of the sleeve 315 and a stopper 317' fixed to the spindle 301. A pair of opposed leaf springs 323, made of steel, have their upper ends fixed to the lower end portion of the sleeve 315 and carry the halves of a split mold 325 which are respectively fixed to the inner sides of the lower ends of said springs in confronting relation. It is preferable that the interior wall of each mold section is formed of a thermosetting resin. The leaf springs 323 are usually open so that the mold sections may be sufficiently spaced apart from each other, and each have an angle cam 329 provided on the backside at a mid portion thereof. The spindle 301 also has at its lower portion an annular cam 335 for cooperation with the angle cams 329, said annular cam being secured to the opposite ends of a lateral pin 333 extending through said spindle.

In operating the apparatus shown in FIGS. 3, 4 and 5, the containers 1 are supplied by the supply conveyor, as in the manner described in the preceding embodiment shown in FIGS. 2A and 2B, into the apparatus which is being operated continuously by way of the worm gear mechanism 219 and 221. The containers thus supplied are bodily rotated about the shaft 201 while being held rigidly in the corresponding detent notches in the annular support member 215'. Referring to FIG. 3, the containers shown travel from the right to left and the container at the rightmost end is the one which has its opening softened with heat. As the container proceeds towards the left, the openings thereof are subjected to preliminary shaping by the associated molds 325, and to final shaping and fusion sealing by the associated molds 331 in sequence, and delivered onto a smooth passage 400.

In FIG. 3, it will be seen that the top end 301' of the spindle 301 is in the highest position, in which it was held originally, at the rightmost end or before the sealing operation, lowers progressively as the sealing operation proceeds and rises again as the molds 325 and 331 move away upwardly from the container 1 upon completion of the sealing operation.

Figure 5A:
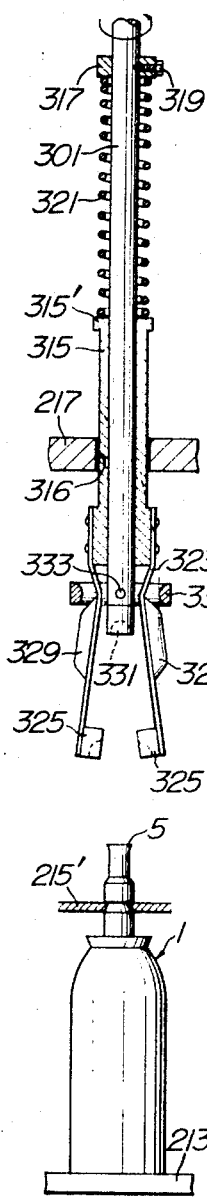
FIGURES 5A to 5D are views illustrating the operating mechanism and operation of mold means for fusion sealing the opening of containers.
Figure 5B:
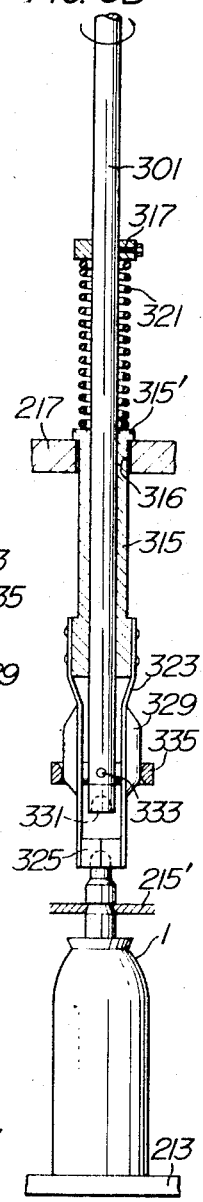
Figure 5C:
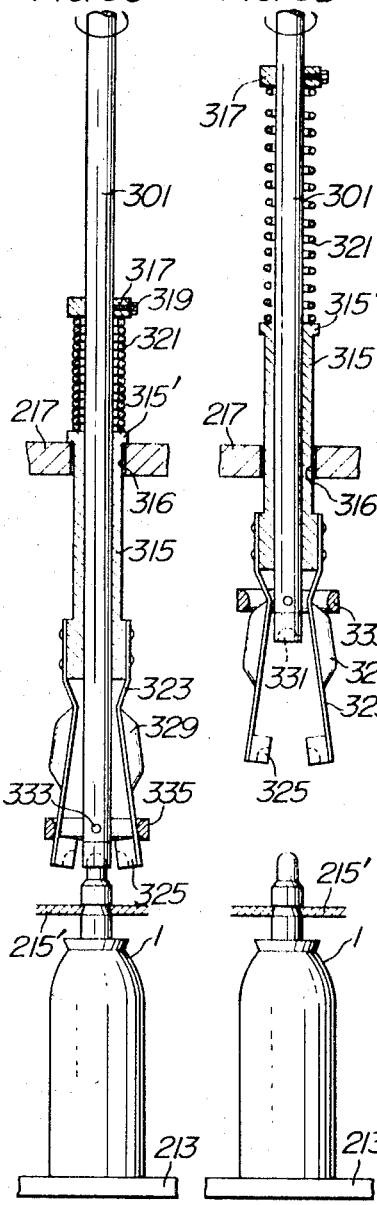
Figure 5D:
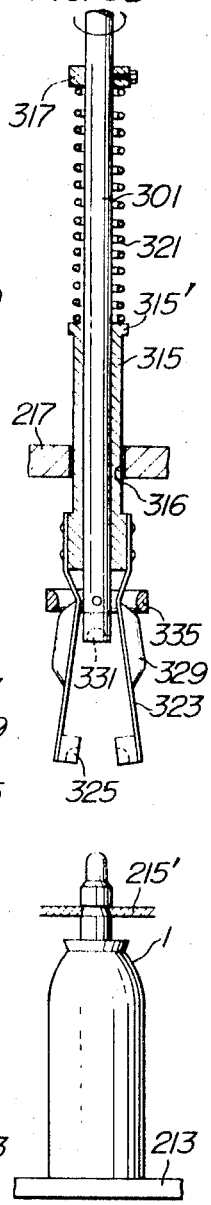

The positions of the molds in various stages of fusion sealing operation are shown in FIGS. 5A to 5D. FIG. 5A shows the position of the mold assembly at a point at which the softening of the opening 5 of container 1 by the electric heater 250 has been completed and the pressure having previously been applied to the body section of said container by the pressing rod 260 has been removed. At this point, the spindle 301 carrying the molds has not commenced its downward movement as yet. When the spindle 301 is caused to move downwardly by the cam action produced by the cam groove 243, the spindle 301 and the molds carried thereby, including the sleeve 315, move downwardly while maintaining the relative position shown and rotating as a whole, until the underside of the flange 315' comes in engagement with the upper surface of lower guide disc 217 and thus the sleeve 315 is stopped from moving further downwardly. At this moment, the mold 325 is still in its open position, though it is located on the level of the opening 5 of container. As the spindle 301 moves further downwardly, the annular cam 335, secured to the lower end portion of said spindle by the pin, comes in engagement with the angle cams 329 pressing said angle cams inwardly. The mold sections 325 are, therefore, closed embracing the opening 5 of container 1 within the cavities formed therein and thereby subjecting said opening 5 to preliminary shaping, as shown in FIG. 5B. A further downward movement of the spindle 301 causes the annular cam 335 to get off the angle cams 329, so that the mold sections 325 are opened again and the finishing mold 331 at the lower end extremity of the spindle 301 is brought into engagement with the preliminary shaped opening 5 and thus the opening is subjected to fusion sealing and final shaping. As may be seen from FIG. 3, the spindle 301 is held in this position for a while before it starts to rise again. Then, the spindle and the molds carried thereby return to the position shown in FIG. 5D in a manner exactly reverse to that of its downward movement. By this time, the opening 5 of the container 1 has been sealed completely as shown in FIG. 5D.

What is claimed is:

1. A method of fusion sealing the opening of a liquid-containing flexible plastic container at the top end thereof, said method comprising the steps of elevating the surface of a liquid in the container by pressing the body section of said container, fusing the opening portion of the container with heat while maintaining the liquid surface at that elevated level, lowering the liquid surface to the original level and fusion sealing the opening thus fused with a concaved mold.

2. A method of fusion sealing the opening of a liquid-containing flexible plastic container at the top end thereof according to claim 1, in which said steps are operated at predetermined positions respectively one after another for each of containers being supplied in a large number in sequence at a predetermined interval and said fusion sealing operation is performed while supporting the opening of each container at a portion near said opening so as to maintain the position of the opening uniform.

3. An apparatus for the fusion sealing of the opening of a liquid-containing flexible plastic container, said apparatus comprising conveyor means for carrying a number of plastic containers thereon in a single row at a predetermined interval, pressing rod means arranged in parallel to the row of containers being carried and adapted to press the body section of each container slightly to thereby raise the surface of a liquid in the container to a level above the shoulder of said container, heating means arranged in parallel to said pressing rod means for fusing the opening of each container with heat, and mold means for engaging the opening of each container at a point downstream of said pressing rod means and said heating means.

4. An apparatus for the fusion sealing of the opening of a liquid-containing flexible plastic container according to claim 3, in which said conveyor means includes a first support disc fixedly mounted on a vertical shaft concentrically perpendicularly thereof for carrying a number of containers thereon and a second support disc having a number of detent notches formed peripherally thereof for the engagement with the necks of containers so as to hold the containers in their fixed positions on said first disc and concurrently to maintain the opening of each container at a predetermined level against the depression of said mold means, and said pressing rod means and said heating means are semi-circular in shape concentric with said vertical shaft.

5. An apparatus for the fusion sealing of the opening of a liquid-containing flexible plastic container according to claim 4, in which said conveyor means is driven intermittently to supply containers each at each movement thereof and said mold means is provided in a predetermined position in which the containers are to be brought to a halt so that said mold means is lowered and seal the opening of each container during a period in which the conveyor means is held stationary.

6. An apparatus for the fusion sealing of the opening of a liquid-containing flexible plastic container according to claim 4, in which said conveyor means is driven continuously and said mold means is mounted to the lower end of each of a number of spindles (301) which are rotatably and vertically movably supported in a corresponding number of holes provided above the respective container receiving positions and peripherally of a member fixedly mounted on said vertical shaft concentrically perpendicularly thereof, said spindles (301) being moved up and down under the action of a stationary cylindrical cam as said conveyor means rotates.

7. An apparatus for the fusion sealing of the opening of a liquid-containing flexible plastic container according to claim 6, characterized by upper and lower guide discs fixed for rotatably and vertically movably supporting said spindles (301) each having the mold means mounted thereto, a finishing mold formed in the lower end face of each of said spindles (301), a sleeve (315) mounted on each of said spindles (301) under the bias of a spring, a pair of downwardly extending leaf springs (323) having their upper end connected to the lower end of said sleeve, a split mold having it halves (325) fixed to the lower ends of said leaf springs respectively in confronting relation, an angle cam (329) provided on the backside of each of said leaf springs (323), and an annular cam secured to the lower end portion of each of said spindles (301) to a pin (333) extending perpendicularly through said spindle, the arrangement being such that, when the spindle (301) is caused to move downwardly, said sleeve is first stopped from moving downwardly by said lower guide disc and then further downward movement of the spindle (301) brings the cams (329) and (335) in engagement with each other causing the split mold (325) to be closed in engagement with the opening of said container, thereby subjecting said opening to preliminary shaping, and thereafter brings said cams (329) and (335) in disengagement from each other causing said split mold to be opened again, following which said spindle (301) moves further downwardly to bring the mold (331) at the lower end thereof in engagement with the preliminary shaped opening of said container to subject said opening to fusion sealing and final shaping.

References Cited

UNITED STATES PATENTS

| | | | |
|---|---|---|---|
| 2,177,919 | 10/1939 | Vogt | 53—37 |
| 2,928,218 | 3/1960 | Lecluyse et al. | 53—373 X |

THERON E. CONDON, Primary Examiner

R. L. SPRUILL, Assistant Examiner

U.S. Cl. X.R.

53—141, 373